(12) United States Patent
Chiu

(10) Patent No.: US 6,722,319 B1
(45) Date of Patent: Apr. 20, 2004

(54) ENVIRONMENT PROTESTANT EQUIPMENT ANIMAL TOILET

(76) Inventor: Chui-Wen Chiu, 9 Nordic Place, North York, Toronto (CA), M3A 2H8

(*) Notice: Subject to any disclaimer, the term of this patent is extended or adjusted under 35 U.S.C. 154(b) by 0 days.

(21) Appl. No.: 09/305,337

(22) Filed: May 4, 1999

(51) Int. Cl.[7] ............................................. A01K 23/00
(52) U.S. Cl. ....................................................... 119/868
(58) Field of Search ................................ 119/867, 868, 119/869

(56) References Cited

U.S. PATENT DOCUMENTS

| | | | | |
|---|---|---|---|---|
| 2,173,356 A | * | 9/1939 | Name not available | 119/868 |
| 3,090,356 A | * | 5/1963 | Name not available | 119/868 |
| 4,103,645 A | * | 8/1978 | Tyler | 119/868 |
| 4,444,152 A | * | 4/1984 | Berardo | 119/869 |
| 4,510,887 A | * | 4/1985 | Lincoln et al. | 119/868 |
| 4,537,153 A | * | 8/1985 | Vidal | 119/868 |
| 4,969,419 A | * | 11/1990 | Fong | 119/869 |
| 5,146,874 A | * | 9/1992 | Vidal | 119/868 |
| 5,315,960 A | * | 5/1994 | Lamp | 119/869 |
| 5,355,836 A | * | 10/1994 | Vallery | 119/868 |
| 5,386,802 A | * | 2/1995 | Hang-Fu | 119/869 |
| 5,738,047 A | * | 4/1998 | McNamara | 119/868 |
| 5,813,369 A | * | 9/1998 | Fujinaga | 119/868 |
| 5,819,691 A | * | 10/1998 | Lavi et al. | 119/868 |
| 5,937,795 A | * | 8/1999 | Raphael | 119/869 |

* cited by examiner

*Primary Examiner*—Thomas Price

(57) ABSTRACT

A body excrement collection device for domestic animals such as a dog is shown. It includes a harness for mounting to the body of the animal and it has a bracket located juxtaposed to the animal's anus. A disposable collection bag is removably mounted to the bracket for collecting the excrement. A urine collection bag is also removably mounted to the harness for collecting urine discharge from a male animal. The waste collection bags are further retained in place with fixed pouches located adjacent to the mounting of the bags. The pouches provide safe protection to the bags as well as support of the weight bags when they are filled. A back flow preventing valve is provide in the urine collection bag to prevent spillage of the urine.

23 Claims, 13 Drawing Sheets

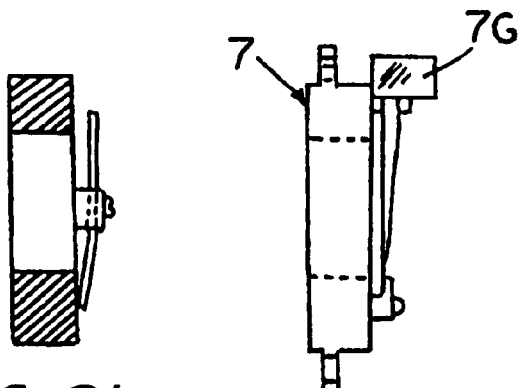
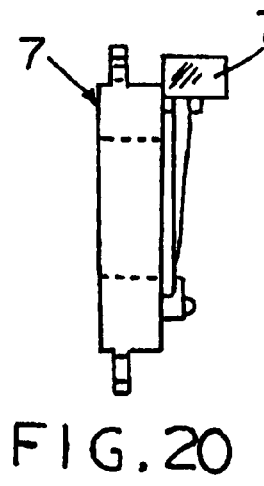
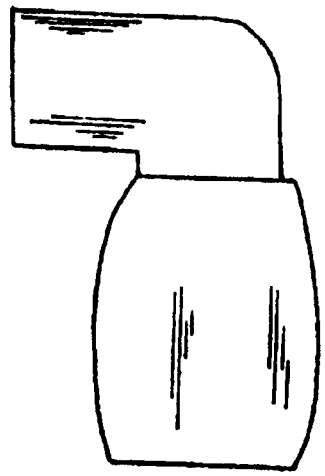
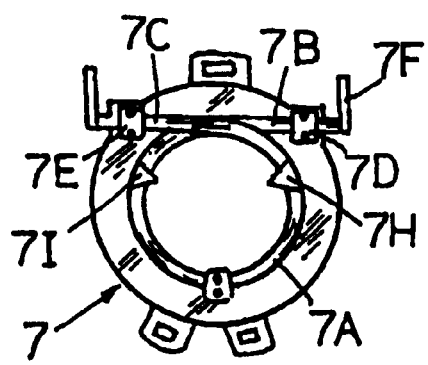
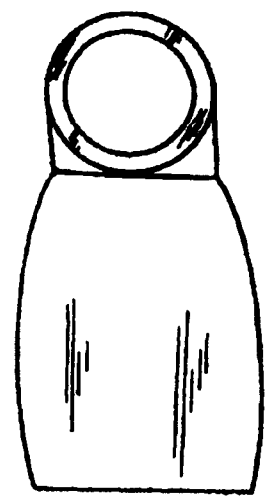

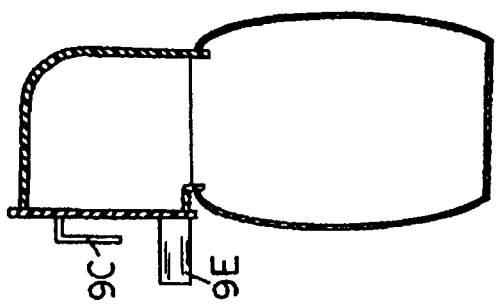
FIG. 29
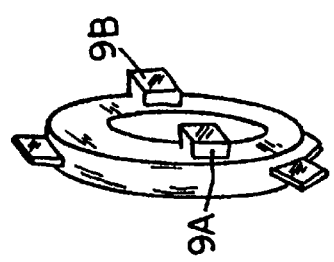
FIG. 28
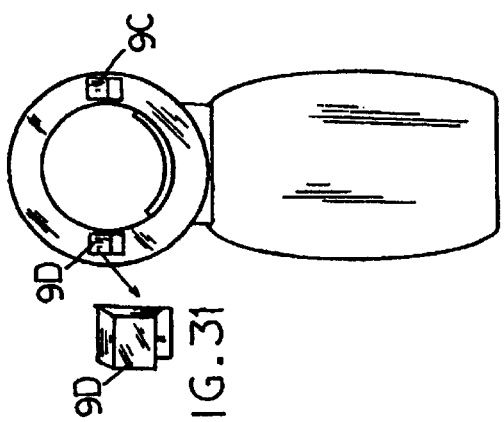
FIG. 30
FIG. 31
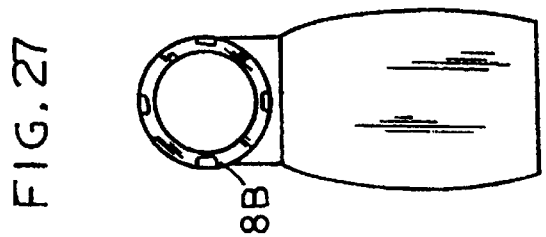
FIG. 27
FIG. 26
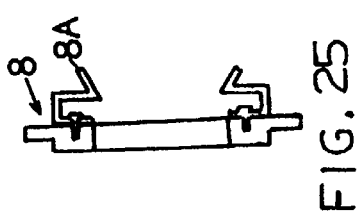
FIG. 25
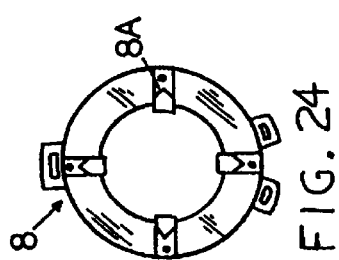
FIG. 24

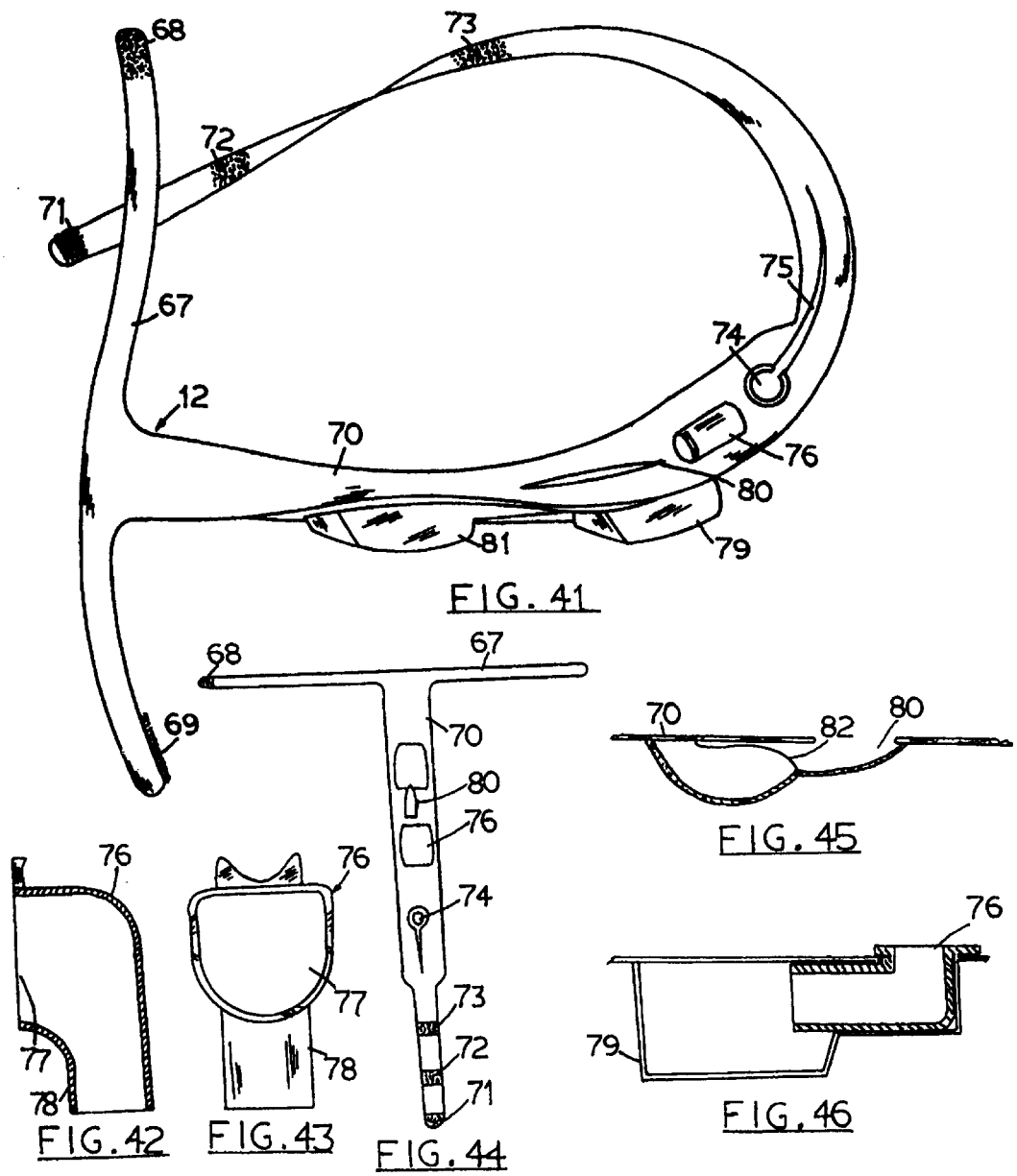

ENVIRONMENT PROTESTANT EQUIPMENT ANIMAL TOILET

BACKGROUND OF THE INVENTION

This invention relates to a device for mounting on a domestic animal particularly on a dog for collecting its excrements.

Human invents flush toilets to dispose of the body excreta, but has neglected to provide similar means for removing excrements for their domestic animals such as dogs. Most responsible dog owners do take precaution to clean up the excreta for their dogs; however, often dogs are allowed to defecate and leave the excrement on roadways, public park lands, and even on the lawns of private properties. The excrement not only creates an unhealthy environment but it also fouls the roadways, and public park lands such that people can not have free enjoyment of these public places without the danger of being soiled by such animal waste. Furthermore, leaving dog excrement on other people's lawn and property is grossly irresponsible of the dog owner and it is an encroachment on the private property right.

It is necessary for dog owners to take their dogs outside of the house promptly every day regardless of the weather condition and/or the willingness of the owners in order for the dogs to release themselves outside the house. Accidental defecation by the dog inside the house must be cleaned up immediately otherwise it would foul the house and present a health hazard.

Similar problems also exist for horses, cows and other domestic animals.

SUMMARY OF THE INVENTION

It is the primary object of the present invention to provide a device which can be mounted on an animal for collecting its excrements.

It is another object of the invention to provide a device having disposable bags securely and yet removably mounted thereon for collecting an animal's excrements.

It is another object of the present invention to provide fixed pouches to safeguard the collection bags and to provide support of the weight of the bags when they are filled.

It is yet another object of the present invention to provide a device which is simple in construction and easy to use.

BRIEF DESCRIPTION OF THE DRAWINGS

FIG. 19 is an isolated front elevation view of another alternative mounting bracket for the present device.

FIG. 20 is a side elevation view of the mounting bracket as shown in FIG. 19.

FIG. 21 is a partial sectional side view of the mounting bracket as shown in FIG. 19.

FIG. 22 is a side elevation view of the excrement collection bag which may be removably mounted to the mounting bracket shown in FIG. 19.

FIG. 23 is a front elevation of the excrement collection bag of FIG. 22.

FIG. 24 is an isolated front elevation of another alternative mounting bracket for the device according to the present invention.

FIG. 25 is a side elevation view of the mounting bracket as shown in FIG. 24.

FIG. 26 is a front elevation of the excrement collection bag for use with the bracket shown in FIG. 24.

FIG. 27 is a sectional side elevation view of the excrement collection bag as shown in FIG. 26.

FIG. 28 is an isolated side perspective view of an alternative mounting bracket for the device according to the present invention.

FIG. 29 is a partial sectional side elevation view of the excrement collection bag for use with the mounting bracket as shown in FIG. 28.

FIG. 30 is a front elevation view of the excrement collection bag as shown in FIG. 29.

FIG. 31 is an isolated enlarged perspective view showing the side hooks provided on the excrement collection bag for removably engaging with the mounting bracket as shown in FIG. 28.

FIG. 41 is a perspective side elevation view of the disposable harness according to the present invention.

FIG. 42 is a front elevation view of the excrement collection means for use with the harness shown in FIG. 41.

FIG. 42 is a partial sectional side elevation view of the excrement collection means.

FIG. 43 is a front elevation view of the excrement collection means of FIG. 42.

FIG. 44 is a top perspective elevation view of the disposable harness of FIG. 41 in an opened fashion.

FIG. 45 is an isolated sectional side elevation view of the urine collection bag provided on the disposable harness of FIG. 41.

FIG. 46 is an isolated sectional side elevation view of the excrement collection bag provided on the disposable harness of FIG. 41.

DETAILED DESCRIPTION OF THE PREFERRED EMBODIMENTS

Figure 1:
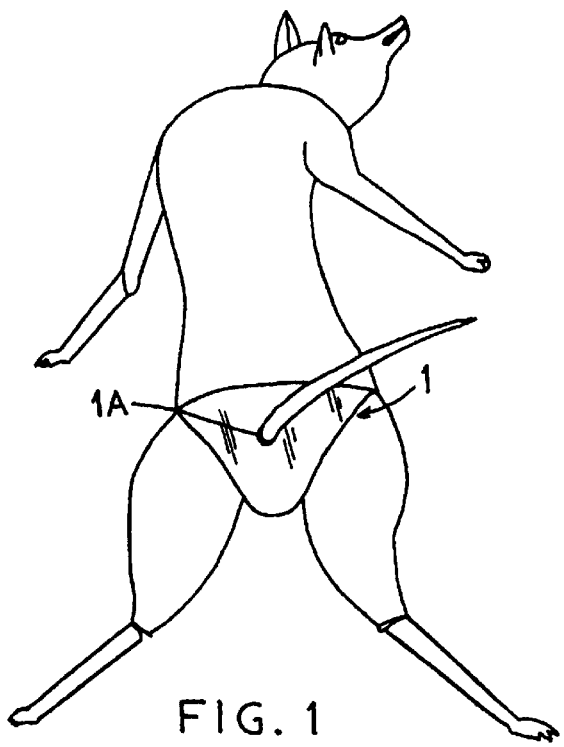
FIGS. 1 to 4 are perspective views showing the use of a diaper-like device according to the present invention which may be mounted on a dog for collecting its excrement.
Figure 3:
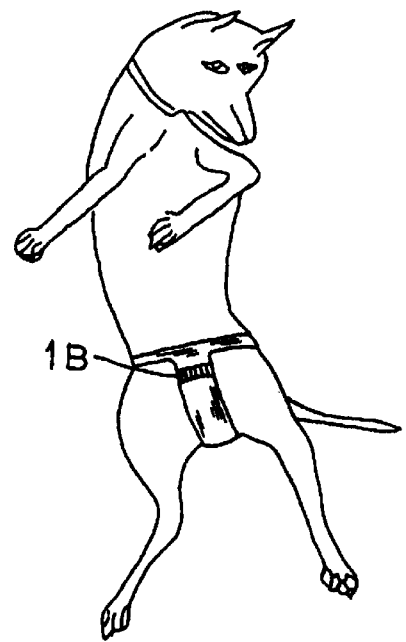
Figure 2:
Figure 4:
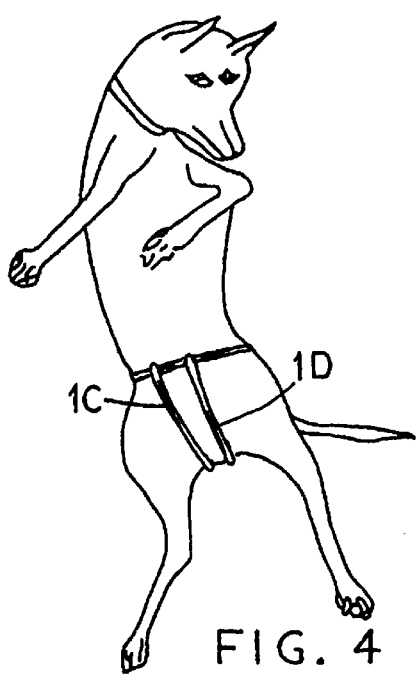
Figure 5:
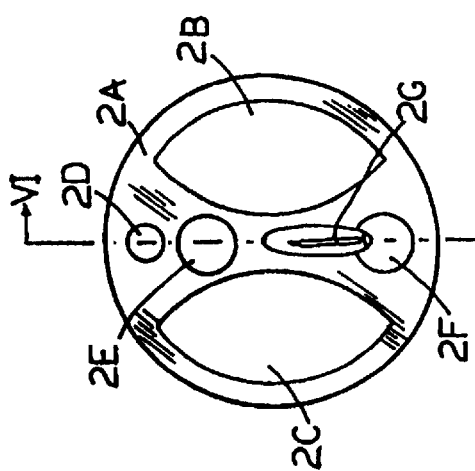
FIG. 5 is a general elevation view of a diaper-like device in the open condition.
Figure 6:
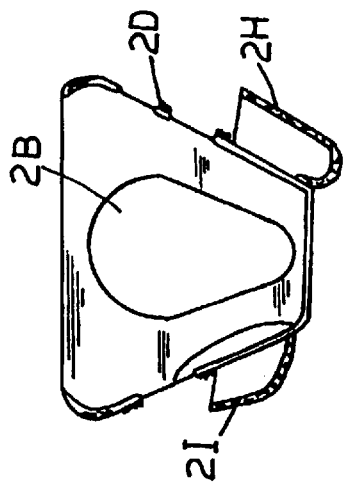
FIG. 6 is a partial sectional side elevation view of the diaper-like device of FIG. 5 along section line VI—VI with the excrement and urine collection bags mounted thereon.
Figure 7:
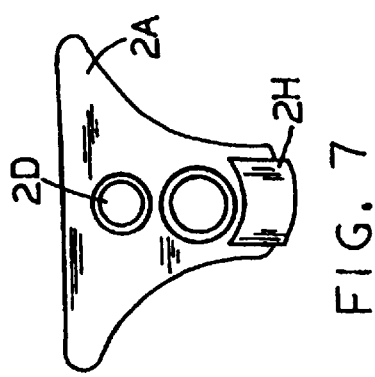
FIG. 7 is a perspective elevation front view of the portion of the diaper-like device with the excrement collection bag mounted thereon.
Figure 8:
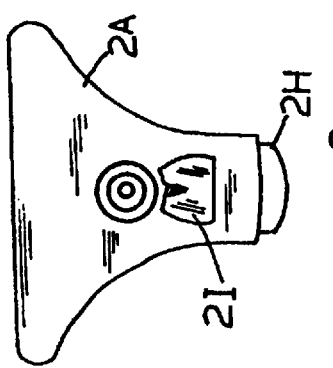
FIG. 8 is a perspective elevation bottom view of the portion of the diaper-like device with the urine collection bag mounted thereon.

With reference to the drawings wherein like reference numerals designate corresponding parts in the several views, the excrement collection device of the present invention may be in the form of a diaper-like member 1 which may be worn by a dog as best shown in FIGS. 1 through 4. A dog is shown as an example for illustration purposes only, and the device may similarly be used for other domestic animals. The diaper-like member 1 is particularly suitable for use with relatively small size dogs. An opening 1A is provided to receive the tail of the dog to be inserted therethrough. A mechanical securing means 1B such as Velcro(a trade mark) may be provided in its bottom portion to facilitate easy and quick wearing or removal of the diaper-like member to or from the dog. The belly portion of the diaper-like member 1 may consist of two strips 1C and 1D for mounting to the belly portion of the dog.

As best shown in FIGS. 5 through 8, the diaper-like member 1 may have a circular body 2A with two large openings 2B and 2C to allow insertion of the hind legs of the dog An opening 2D is provided to accommodate the tail of the dog, and an opening 2E which will be in registry with the anal area of the dog when the member 1 is mounted to the latter. The outer edges of the opening 2E is provided with securing means 2F such as Velcro (trade mark) for mounting an excrement collection bag ( not shown ) on member 1. A slit opening 2G is provided to permit the penis of a male dog to insert therethrough. An excrement collection bag support pouch 2H and a urine collection bag support pouch 21 are respectively provided adjacent the bag mounts for supporting the weight the filled excrement collection bag and the urine collection bag. These pouches also provide a safeguard for the bags so that they will secured in place even when the dog is moving about, and the bags would not be pulled away from the mounting by the dog.

Figure 9:
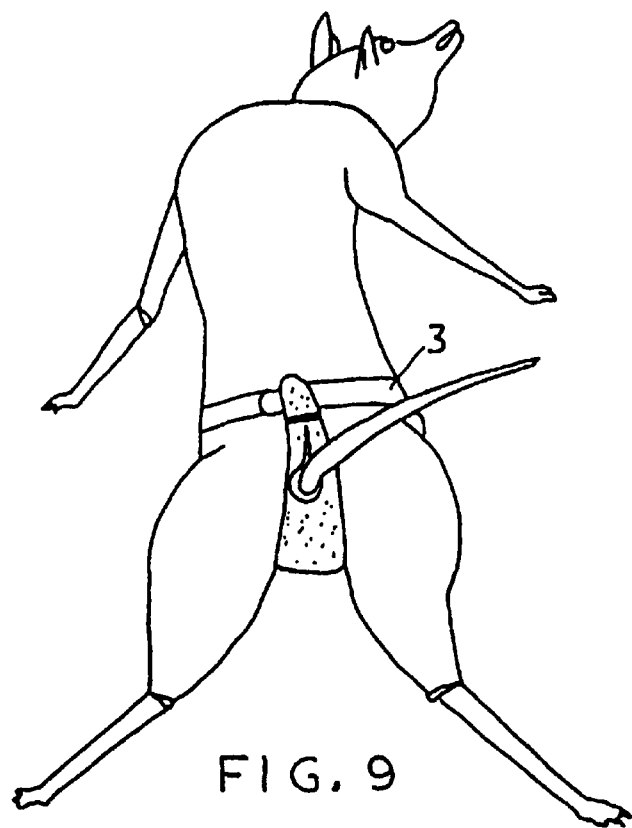
FIG. 9 is a perspective elevation view showing the diaper-like device of the present invention mounted on the dog.

The diaper-like device 1 may alternatively be provided with a harness 3 which embraces the belly portion of the dog and the body portion may be removably secured to the harness 3 with the provision of fastening means such as Velcro( a trade mark) as best shown in FIG. 9.

Figure 10:
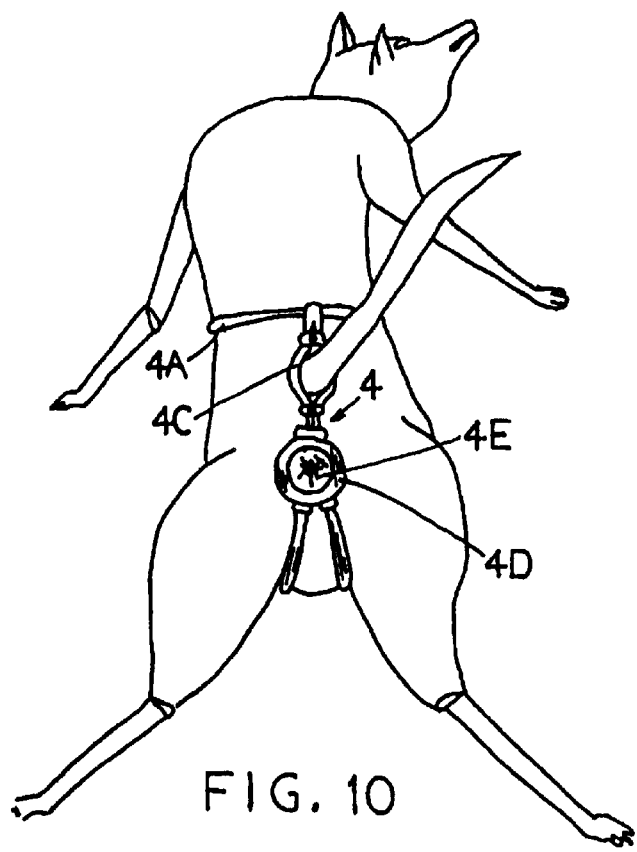
FIG. 10 shows a perspective elevation view of a harness construction of the present device mounted on the dog.
Figure 11:
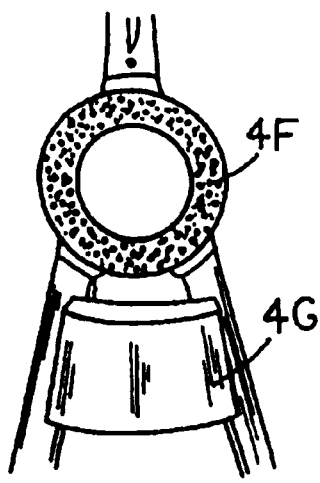
FIG. 11 is an isolated elevation view showing the provision of one form of removable fastening means provided at the bracket of the harness for mounting an excrement collection bag thereto.
Figure 12:
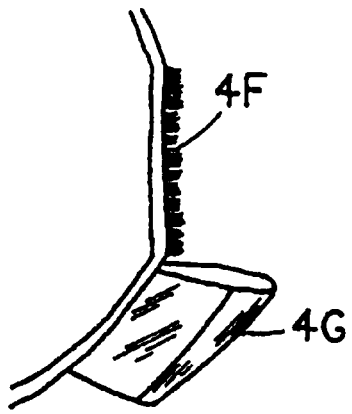
FIG. 12 is a side elevation view of the device shown in FIG. 11.
Figure 13:
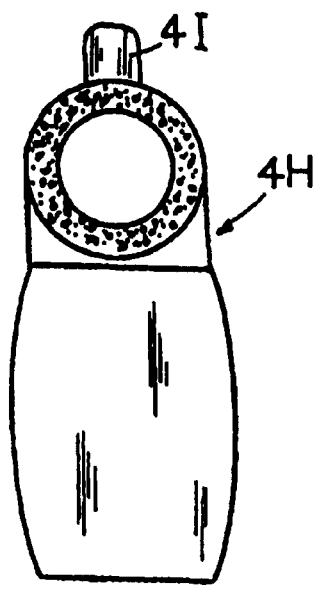
FIG. 13 is a front elevation of an excrement collection bag for use with the device shown in FIGS. 10 and 11.
Figure 14:
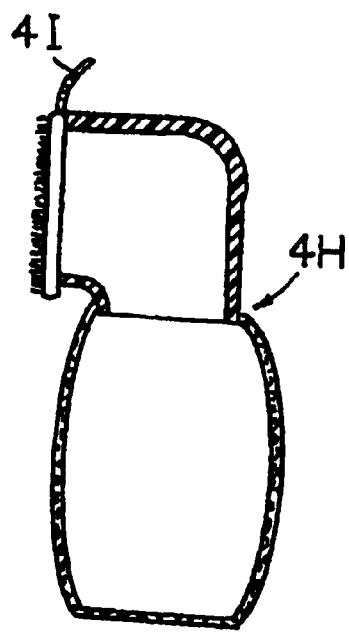
FIG. 14 is a side elevation view of the device shown in FIG. 13.

As best shown in FIG. 10, the device according to the present invention may be provided with a harness 4 having a belly belt 4A which may be removably mounted around the belly portion of the dog and a cross belt 4B extending between the upper portion of the body of the dog to its belly portion so as to cover over its rear end. The cross belt 4B includes an opening 4C to accommodate the tail of the dog to be extended therethrough and a mounting bracket 4D which will juxtapose the anal area of the dog. The bracket 4D has an opening 4E which is in registry with the anus of the dog. As best shown in FIGS. 11 and 12, Velcro( a trade mark )mounting means 4F and a support pouch 4G are provided at the bracket 4D as well as on the harness 4 such that an excrement collection bag 4H may be removably mounted to the bracket. A pull tab 41 is provided on the excrement collection bag 4H to facilitate its removal from the mounting bracket 4D. A similar collection bag (not shown) may also be provided for collecting the urine excrement.

Figure 15:
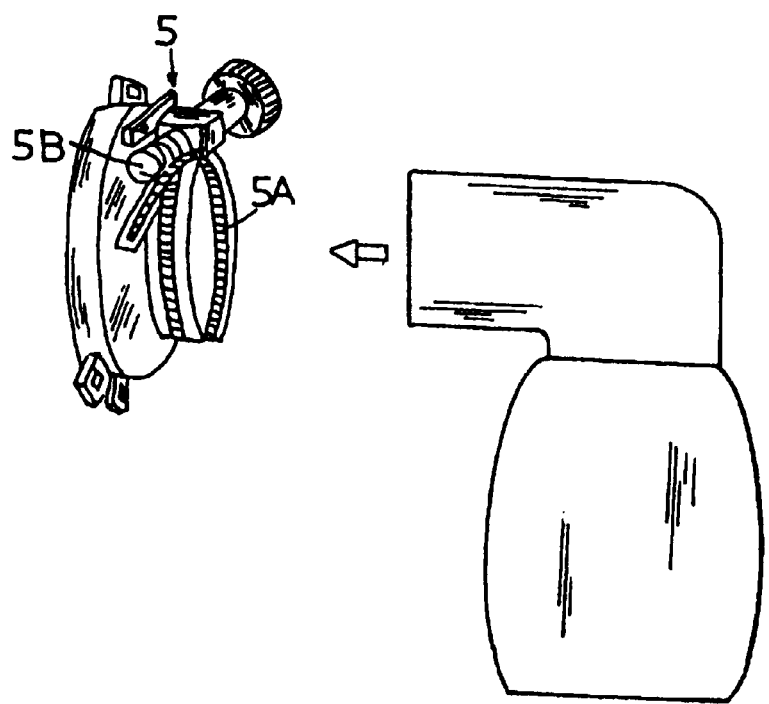
FIG. 15 is an isolated side elevation view showing an adjustable mounting bracket and a removable excrement collection bag for the device according to the present invention.

An alternative mounting bracket 5 as shown in FIG. 15 may be provided for removably mounting the excrement collection bag to the device. A flexible band 5A forming a circular clamp is provided at the bracket 5. The circular clamp may be adjusted by operating a threaded finger of a worm screw 5B mounted on the bracket. The circular clamp has slot openings which engage with the threads of the worm screw 5B such that the clamp may adjusted to allow an excrement collection bag to be mounted or removed quickly and easily from the bracket.

Figures 16, 17, 18:
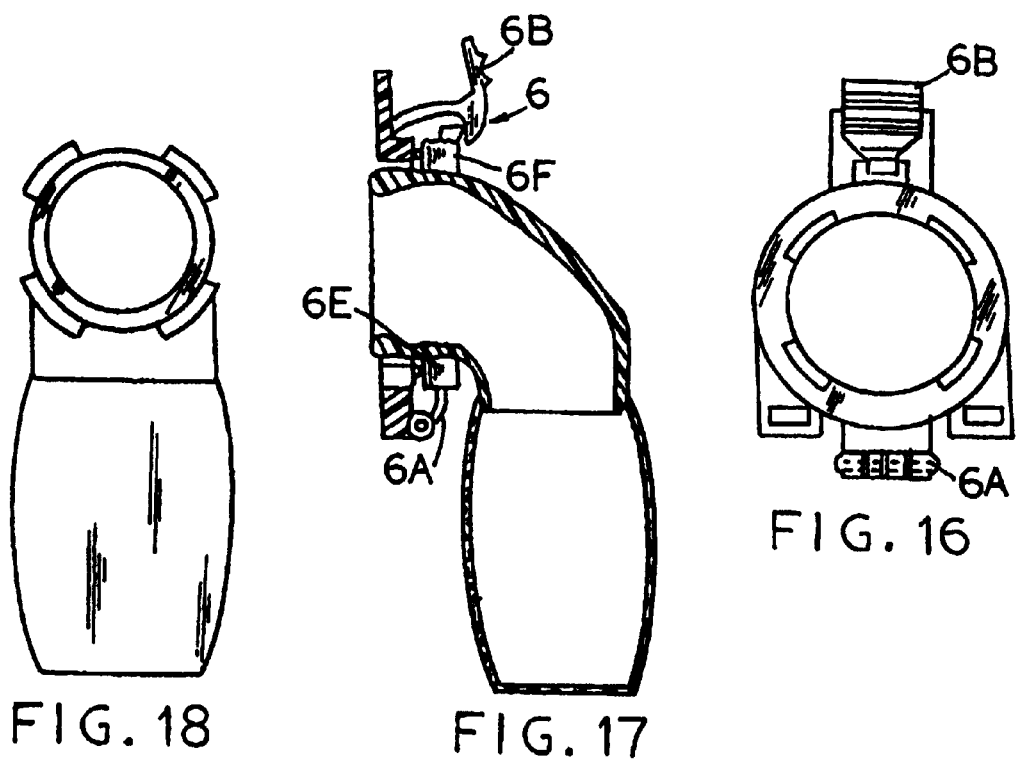
FIG. 16 is an isolated front elevation view of an alternative mounting bracket construction for the device of the present invention.
FIG. 17 is a side partial sectional view showing the mounting of an excrement collection bag on the mounting bracket shown in FIG. 16.
FIG. 18 is a front elevation view of the removable bag for use with the mounting bracket shown in FIG. 16.

Another alternative mounting arrangement 6 as shown in FIGS. 16 through 18 may be provided at the mounting bracket. In this construction, a hooking tab 6A is provided at the lower portion of the bracket and a spring latch 6B is provided at the top portion of the bracket. Radially extending tabs 6F and 6E are provided on the flange portion of the neck of the excrement collection bag such that the tabs 6F and 6E will engage with the hooking tab 6A and spring latch 6B for readily mounting or removing the excrement collection bag to or from the bracket.

Another alternative mounting arrangement 7 may be provided at the mounting bracket for mounting the excrement collection bag as best shown in FIGS. 19 through 21. In this construction, a circular torsion spring 7A is mounted on the bracket. The two end portions 7B and 7C of the torsion spring 7A are slidably held by two supports 7D and 7E respectively, and the ends 7F and 7G of the torsion spring are bent at 90 degrees such that the coiled portion of the torsion spring 7 may be expanded by pressing the ends 7F and 7G towards each other so that an excrement collection bag may be quickly and easily mounted and removed from the bracket. Two triangular spikes 7H and 7I are formed on the torsion spring to provide a biting action for securely mounting the excrement collection bag on the bracket. FIGS. 22 and 23 show the excrement collection for use with this type of mounting arrangement.

Another mounting arrangement 8 as best shown in FIGS. 24 and 25 may be provided for amounting the excrement collection bag. Four substantially S-shaped latching springs 8A are provided around the mounting bracket. The latching springs 8A have a latching end extending into the opening of the mounting bracket. An excrement collection bag may be slidably inserted into the opening such that the latching springs 8A will grasp the neck of the collection bag. Associated depressions 8B may be formed in the neck of the collection bag so that the latching ends of the latching springs 8A will engage with the depressions 8B to maintain the collection bag securely fastened to the bracket.

Another mounting arrangement 9 as best shown in FIGS. 28 through 30 may be provided on the mounting bracket and the excrement collection bag for removably securing the latter to the bracket. In this construction, two U shaped pedestals 9A and 9B are formed on the two sides of the mounting bracket. Two L-shaped hooks 9C and 9D are provided on the flange of the mouth of the excrement collection bag as shown in FIG. 29 and the isolated enlarged view in FIG. 31. The excrement bag may easily be mounted onto the mounting bracket by simply engaging the hooks 9C 9D with the opening of the pedestals 9A and 9B to hang the bag on the bracket. An extended arcuate tongue 9E is provided at the lower portion of the flange of the neck of the collection bag to enhance the securement of the bag to the bracket.

Figure 32:
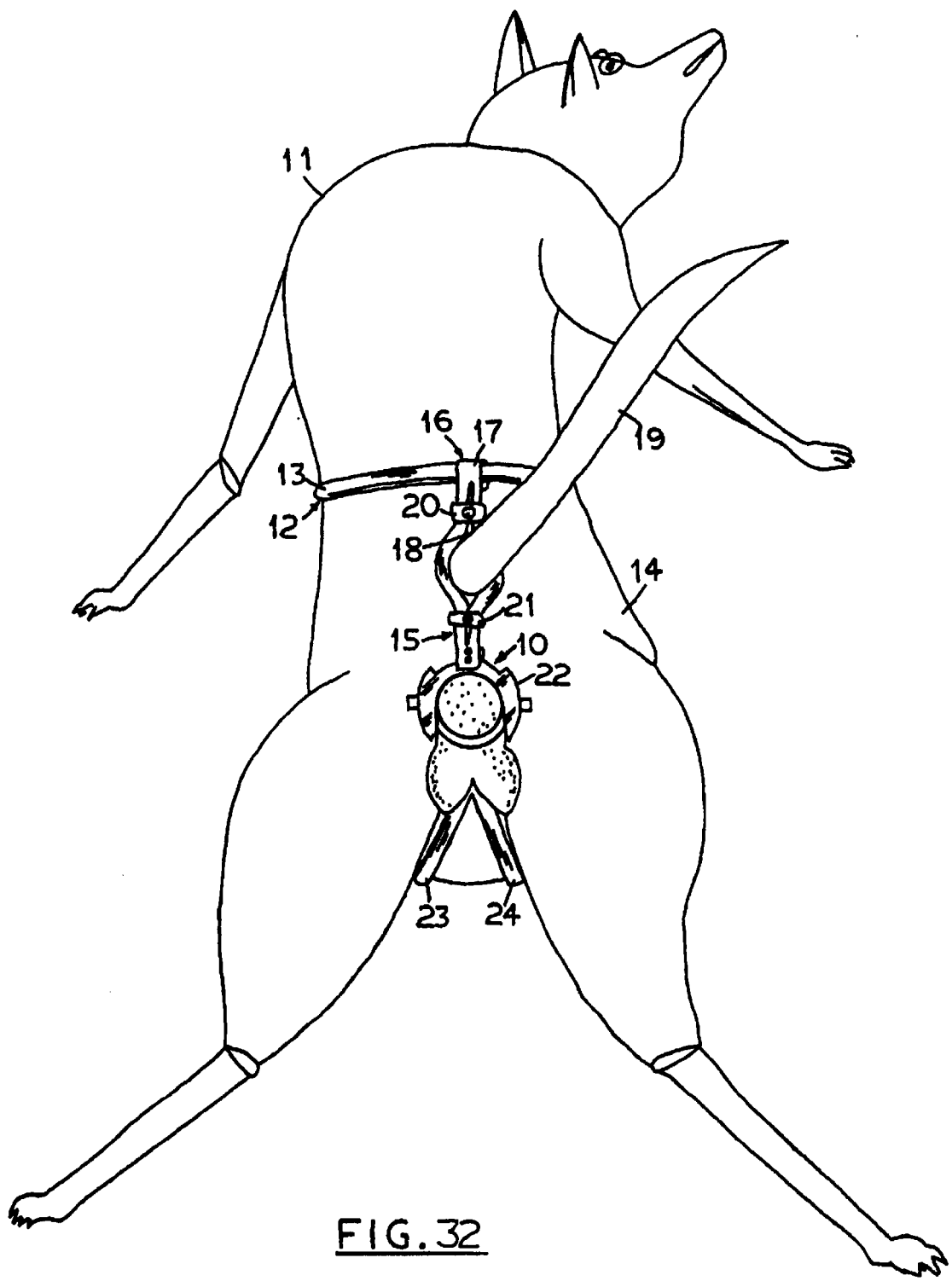
FIG. 32 is an elevation view showing the preferred embodiment of the device of the present invention mounted on a dog.
Figure 33:
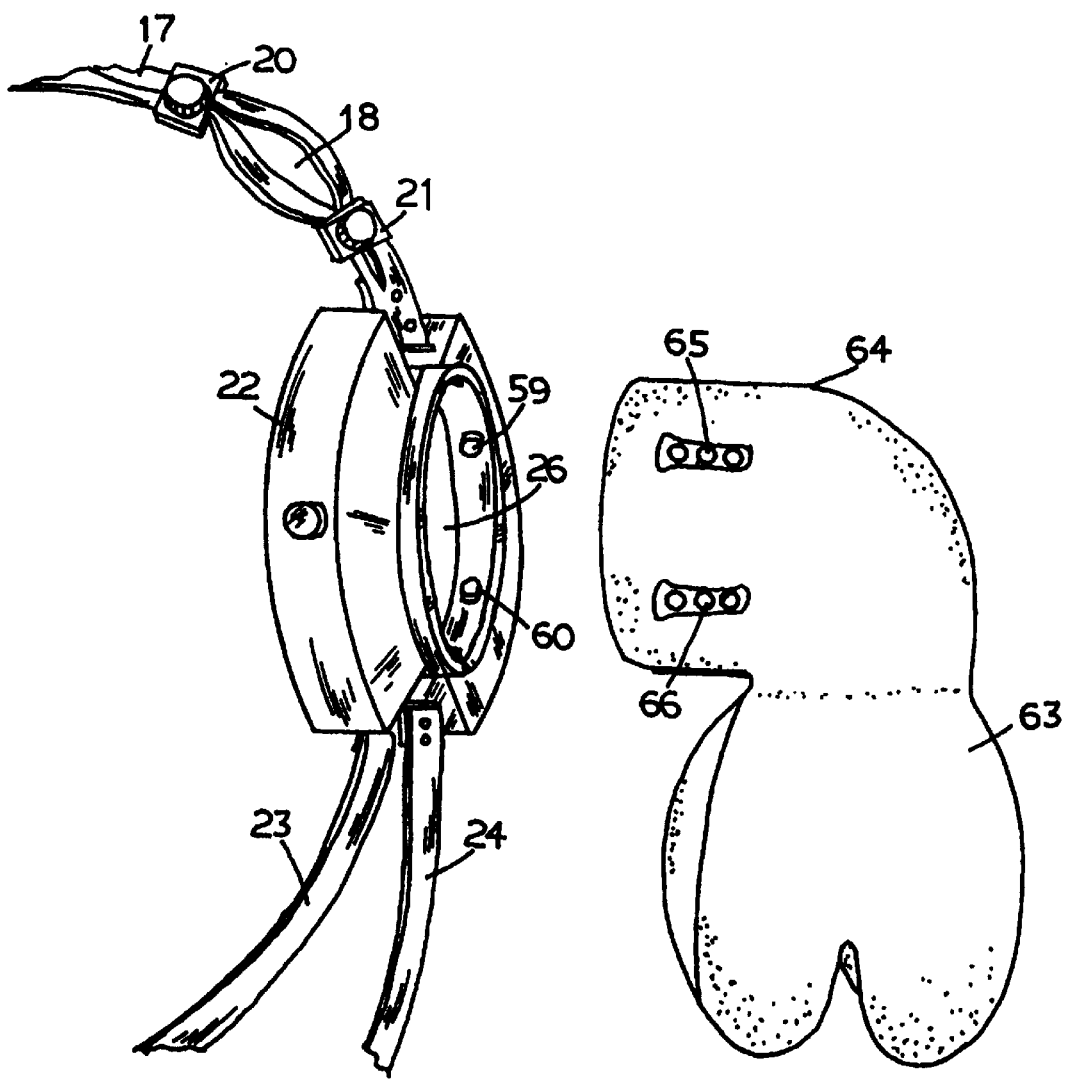
FIG. 33 is an isolated side elevation view showing partially the harness on which the remounting bracket and the collection bag according to the present invention are mounted.

A preferred embodiment of the excrement collection device 10 according to the present invention is generally shown in FIG. 32 mounted to a dog 11 according to the present invention. The excrement collection device 10 has a harness 12 for mounting to the body of the dog 11.

The harness 12 has an adjustable waist strap 13 which may be mounted around the waist 14 of the dog and a cross strap 15 is slidably mounted to the waist strap 13 and to be located around the rear end of the dog. The cross strap 15 has a top strap 16 which has a looped end 17 slidably coupled to the waist strap 13. An opening 18 is formed in the top strap 16 which is provided to accommodate the tail 19 of the dog. Two adjustable clamps 20 and 21 are provided at the two ends of the opening 18 such that the opening size may be adjusted to fit snugly around the tail 19 of the dog. A generally annual-shaped bracket 22 is mounted to the top strap 16 and two under straps 23 and 24. The under straps 23 and 24 are to be located under the belly of the dog and their other ends are secured to the lower portion of the waist strap 13. The cross strap 13, and the under straps 23 and 24 may be adjusted to mount the harness 12 tightly around the body of the dog with the bracket 22 abutting the anus of the dog. The various straps may be made of an elastic material to ensure that the harness 12 may securely embrace the body of the dog.

Figure 34:
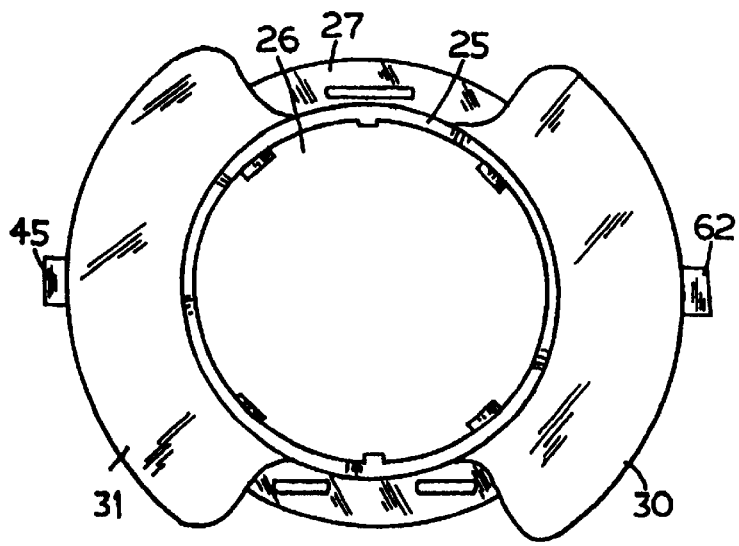
FIG. 34 is a front elevation view of the mounting bracket.
Figure 35:
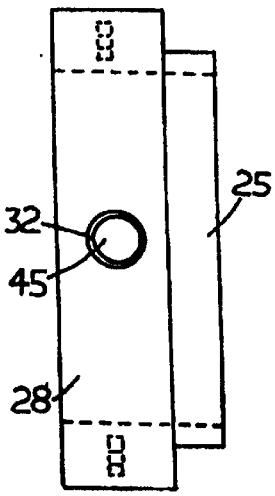
FIG. 35 is a side elevation view of the mounting bracket.
Figure 36:
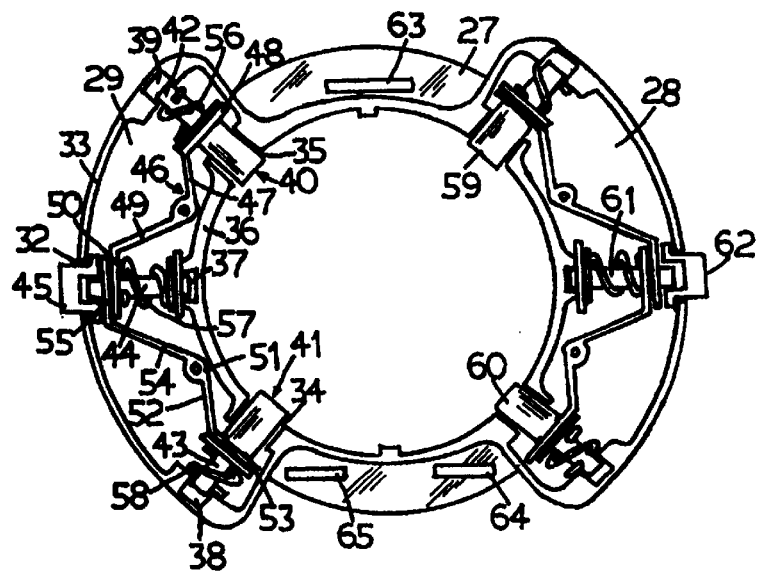
FIG. 36 is a front elevation view of the mounting bracket with the front cover removed to show the interior assembly therein.

The bracket 22 as best shown in FIGS. 34, 35 and 36 has a circular ring body 25 with a through opening 26, and a round base 27 which will abut the rear end of the dog when the device 10 is mounted on the body 25 with the through opening 26 located around the dog's anus. Two arcuate extension housings 28 and 29 are integrally formed on the circular ring body 25 and extending outwardly therefrom.

Figure 37:
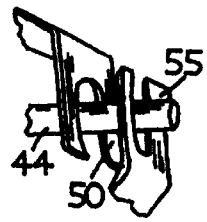
FIG. 37 is an isolated enlarged perspective view showing the pivotal retaining arms inside the mounting bracket for operating the latch.

Two covers 30 and 31 are provided for the arcuate extension housings 28 and 29 respectively. A side opening 32 is formed in the outer side wall 33 of the left arcuate extension housing 29 and two openings 33 and 35 are formed in its inner side wall 36. A depression 37 is formed on the inside of the inner side wall 36 and located directly opposite to the opening 32 in the outer side wall 33. Two additional depressions 38 and 39 are formed in the inside of the outer side wall 33 and located directly opposite to the openings 34 and 35 respectively in the inner side wall 36. A first cylindrical latching pin 40 is slidably located in the opening 35; similarly and a second cylindrical latching pin 41 is slidably located in the opening 34. The first cylindrical latching pin 40 has a rear portion 42 engages with the depression 39, and the second cylindrical latching pin 41 has a rear portion 43 engages with the depression 38. The rear portion of the latching pins 40 and 41 has a smaller diameter than the front portion of these pins. A slider pin 44 having a large circular head 45 mounted thereon is slidably located in the opening 32 with its rear end engaging with the depression 37. A first substantially V-shaped pivotal member 46 is pivotally mounted in the extension housing 29. One arm 47 of the pivotal member 46 has a flat end portion 48 which has an open end slot formed therein; similarly the other arm 49 of the pivotal member 46 also has a flat end portion 50 with an open end slot formed therein. The open end slot in the flat end portion 48 slidably engages with the rear portion of the latching pin 42 while the open end slot in the flat end portion 50 slidably engages with the slider pin 44. Similarly, a second substantially V-shaped pivotal member 51 is pivotally mounted in the extension housing 29. One arm 52 of the pivotal member 51 has a flat end portion 53 with an open end slot, and the other arm 54 has a flat end portion 55 having another open end slot. The open end slot in the flat end portion 53 slidably engages with the rear end portion of the latching pin 41 while the open end slot in the flat end portion 55 also slidably engages with the slider pin 44. A coil spring 56 is mounted on the rear portion of the latching pin 42, a second coil spring 57 is mounted on the slider pin 44, and a third coil spring 58 is mounted on the rear portion of the latching pin 43. The coil springs 56, 57 and 58 cooperate with the pivotal arms 46 and 51 to maintain the latching pins 40 and 41 normally extending outwards into the opening 26. The latching pins 40 and 41 will retract into the openings 34 and 35 respectively by depressing the circular head 45 of the slider pin 44. Similarly, latching pins 59 and 60, and slider pin 61 are provided in the right arcuate extension housing 28; and the latching pins 59 and 60 may be retracted by depressing the round head 62 of the slider pin 61. FIG. 37 shows an isolated enlarged view of the slide engagement between the open end slots formed on the flat portions of the pivotal arms and the sliding pin.

Slots 63 is formed in the round base 27 for receiving the cross belt 15 to be mounted to the bracket 22. Slots 64 and 65 are provided in the round base 27 for mounting the under straps 23 and 24 to the bracket 22.

Figure 38:
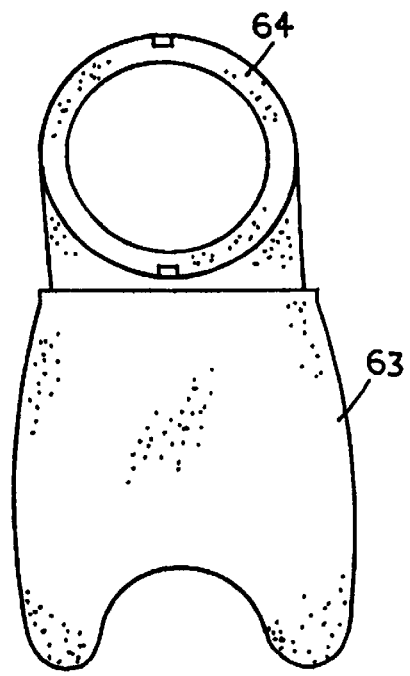
FIG. 38 is a front elevation perspective view of the disposable collection bag of the device according to the present invention.
Figure 39:
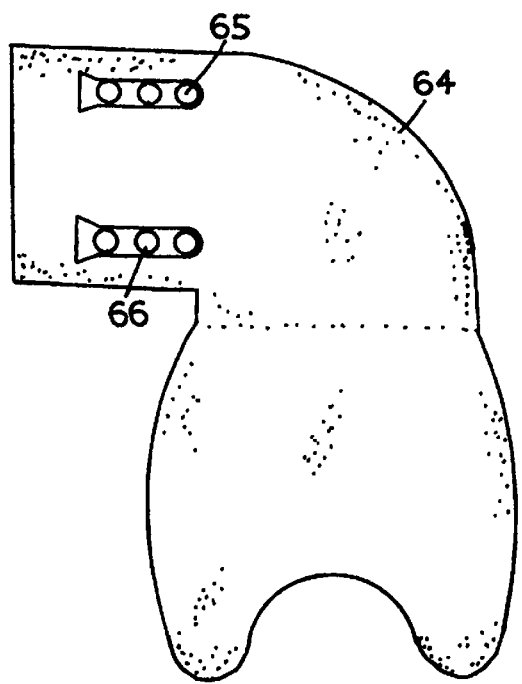
FIG. 39 is a side elevation view of the disposable collection bag.
Figure 40:
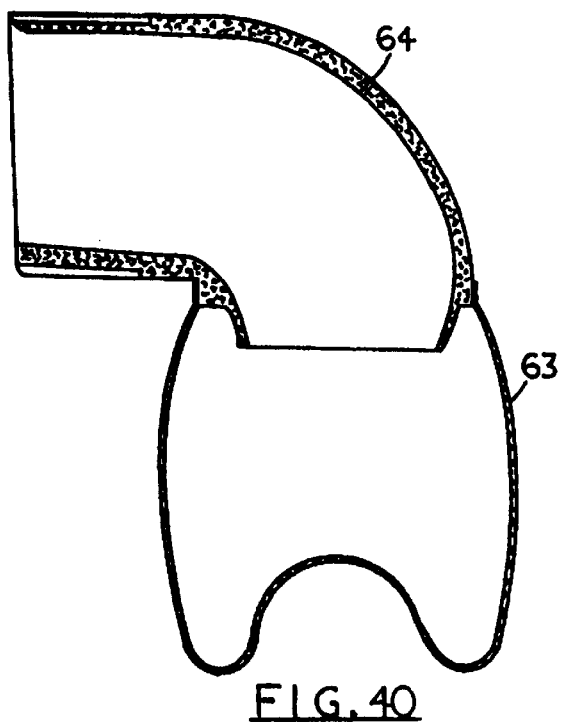
FIG. 40 is a partial sectional side elevation view of the disposable collection bag.

A collection bag 63 for use with the present device is best shown in FIGS. 38, 39 and 40. The collection bag 63 is made of a bio-degradable material such as paper or degradable plastic and has a substantially rigid L-shaped attachment portion 64 which has a diameter equal to that of the opening 26 of the bracket 22 such that it may be slidably inserting therein. A series of depressions 65 and 66 are formed on one side of the L-shaped attachment portion 64, which are operative to engage with the latching pins 40 and 41, and similar depressions are formed on the other side for engagement with the latching pins 59 and 60, for removably mounting the collection bag 63 to the bracket 22.

A disposable device according to the present invention is generally shown in FIG. 41. In this embodiment, the harness 12 is made of a disposable material and it is substantially T-shaped as best shown in FIG. 44 which includes a waist strap 67 operative for embracing around the body of the dog. Fastening means such as Velcro( a trademark ) fastening means 68 and 69 are provided at the two ends of a transverse strap 67 for mounting it quickly and securely around the body of the dog. A diaper strap 70 extends perpendicular to the waist strap 67. Fastening means 71, 72 and 73 similar to fastening means 68 and 69 are provided at the free end of the diaper strap 70 and at selected distances from the free end such that the free end of the diaper strap 70 may then be secured to the waist strap 67. When thus mounted, the diaper strap 70 will extend over the back of the dog and will wrap tightly over its rear end and belly. A circular opening 74 having an expandable extension slit 75 is formed in the diaper strap 70 to permit the tail of the dog to extend through it. A generally L-shaped attachment tubular member 76 is mounted on the diaper strap 70. The tubular member 76 has a collection opening 77 which will abut the anus of the dog when the harness 12 is properly mounted on the dog. The tubular member 76 has a free end 78 extending outside from the diaper strap 70 for receiving an excrement collection bag (not shown) to be removably mounted on the strap, and an excrement collection bag supporting pouch 79 is provided on the strap to protect the waste collection bag and to support its weight after it has been filled. A slit opening 80 is formed in the diaper strap 70 to permit the penis of a male dog to be extending therethrough, and a urine collection bag as shown in FIG. 45 may be mounted on the diaper strap 70 for collecting the urine discharge from the dog. A urine collection bag supporting pouch 81 is provided on the diaper strap to protect the urine collection bag and to support its weight when it has been filled such that the latter would not dislodge from the mounting when the dog is moving or running. As best shown in FIG. 45, the urine collection bag is provided with a back flow preventing valve 82 to prevent leakage of the urine from the bag when it is filled. The valve 82 may be in the form of a pivotal flap attached to one side of the neck of the bag.

Figure 47:
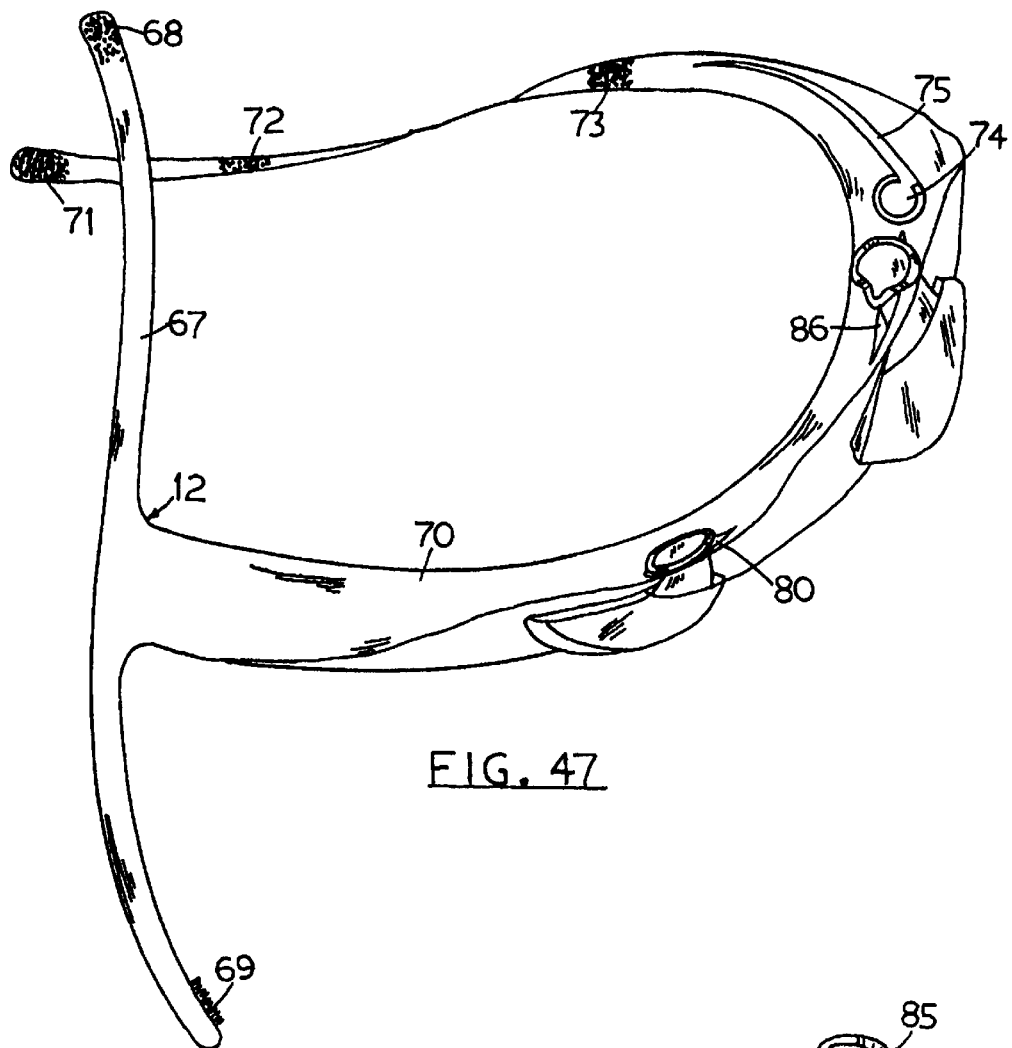
FIG. 47 is another embodiment of the harness according to the present invention with insertable excrement collection bag and urine collection bag.
Figure 49:
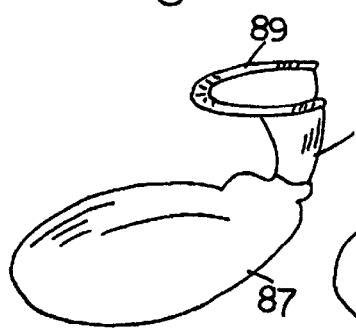
FIG. 49 is a perspective side elevation view of the urine collection bag of FIG. 48.
Figure 48:
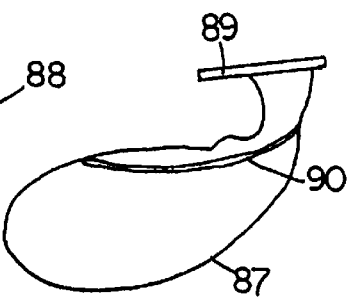
FIG. 48 is a partial seectional side elevation view of the urine collection bag used with the harness of FIG. 47 showing the provision of a back flow preventing valve in the bag.
Figure 50:
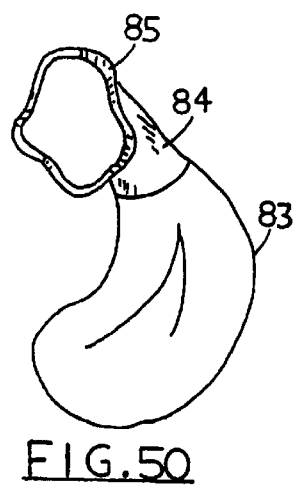
FIG. 50 is a perspective side elevation view of the excrement collection bag for the harness shown in FIG. 47.

A further alternative embodiment of the device according to the present invention is best shown in FIG. 47. The disposable harness 12 is similar to that shown in FIG. 41, except the excrement collection bag 83 is in the form of a flexible bag having a stiff mounting neck portion 84 with an enlarged rim 85 such that the excrement collection bag 83 may be mounted to the diaper strap 70 by simply inserting the enlarged rim 85 through a slit opening 86 formed in the diaper strap 70. Similarly, the urine collection bag 87 has a substantially L-shaped neck portion 88 and an enlarged mouth 89 which may be inserted through the slit opening 80 for mounting to the diaper strap 70 for collecting any urine discharge from the dog. The urine collection bag 87 is also provided with a back flow preventer valve 90 to prevent the urine inside the bag to spill outwards therefrom. The urine collection bag 87 is also provided with a back flow preventing valve 90 as best shown in FIG. 48.

It can be appreciated that the present device not only greatly reduces the hardship of requiring the dog owner to face the problem of having to walk the dog outdoors even during adverse weather conditions and having to wait for the dog to defecate and then cleaning after it, but it also eliminates the potential of any unattended dog excrement from contaminating the ecological environment.

Obviously numerous modifications and variations of the device of the present invention are possible in light of the above teachings. It is therefore to be understood that within the scope of the appended claims, the invention may be practised otherwise than as specifically described herein. However, I would encourage others to improve on the present device and I would like to donate 30% of the profit derived from the present invention to those who require financial assistance in seeking such further improvements to my invention.

I claim:

1. A device wearable on a domestic animal for collecting waste excrement from said animal, comprising a harness member operative for mounting to the body of said animal, a first opening formed in said harness member, said first opening being in registry with the anal area of said animal when said harness member is worn by said animal, first mounting means provided around said first opening and adapted for mounting an excrement collection bag to said harness member, a second opening formed in said harness member, said second opening being operative to receive the penis of a male animal to be inserted therethrough when said harness member is worn by said animal, second mounting means provided around said second opening and adapted for mounting a urine collection bag to said harness member, a third opening formed in said harness member and adapted to receive the tail of said animal to extend therethrough, a first pouch located adjacent to said first opening and adapted to carry said excrement collection bag and operative for protecting from being removed by said animal and supporting said excrement collection bag when said excrement collection bag is filled with excrement.

2. A device according to claim 1 wherein said harness member includes an adjustable waist strap operative to embrace a waist portion of said animal and a cross strap substantially perpendicular to said waist strap and operative to cover over the rear end of said animal when said harness member is worn by said animal, one end of said cross strap being fixedly secured to said waist strap and a free end of said cross strap being adjustably secured to said waist strap.

3. A device according to claim 2 wherein said urine collection bag includes a back flow preventing valve therein operative to prevent urine from spilling out of said urine collection bag when said animal is moving.

4. A device according to claim 3 wherein said harness member is made of a disposable material.

5. A device according to claim 4 wherein said first opening is a first slit opening and said second opening is a second slit opening, said excrement collection bag having an expanded mouth portion operative insertable into said first slit opening for removably mounting said excrement collection bag on said harness member, and said urine collection bag also having an expanded mouth portion operative insertable into said second slit opening for removably mounting said urine collection bag on said harness.

6. A device according to claim 5 including a bracket member located at said first opening, said bracket member having mounting means therein adapted for mounting said excrement collection bag removably thereon.

7. A device according to claim 6 wherein said mounting means in said bracket member includes an adjustable clamp, said clamp comprising a flexible band surrounding said first opening and a worm screw mounted on said bracket member, said worm screw having a threaded portion engaging with a plurality of slot openings formed in said flexible band, said clamp being adjustable by operating said worm screw.

8. A device according to claim 7 wherein said mounting means in said bracket member includes a hooking tab located at a lower portion of said bracket member and an adjustable spring latch located at a top portion of said bracket member, said hooking tab and said adjustable spring latch being operative for engaging with radial tabs provided on said excrement collection bag for removably mounting said excrement collection bag to said harness member.

9. A device according to claim 8 wherein said mounting means includes a circular torsion spring having two free ends extending sideways of said first opening, said torsion spring being expandable being pressing said two free ends towards one another, and two triangular spikes formed on said torsion spring, said spikes being operative to bite onto said excrement collection bag for mounting said excrement collection bag firmly and securely on said harness member.

10. A device according to claim 8 wherein said mounting means includes a plurality of substantially S-shaped springs mounted around said first opening, said S-shaped springs having a finger portion extending towards the center of said first opening and being operative to resiliently engaged with a neck portion of said excrement collection bag for mounting said excrement collection bag removably on said harness member.

11. A device according to claim 8 wherein said mounting means includes two hanger brackets formed on said bracket member, said hanger brackets being operative to receive two inverted L-shaped hooks provided on a mounting rim portion of said excrement collection bag for removably mounting said excrement collection bag on said harness member.

12. A device wearable on a domestic animal for collecting waste excrement from said animal, comprising:
- a harness for mounting to said animal, said harness having a waist strap member operative for securely embracing the waist of said animal, and a diaper strap member extending substantially perpendicular to said waist strap and operative to embrace the rear end and belly of said animal,
- a substantially annular bracket member mounted on said diaper strap member, said annular bracket member having a circular opening and said annular bracket member abutting the anal area of said animal with said circular opening encircling around the anus of said animal,
- said circular opening having a circular inner side wall,
- a plurality of retractable latching members mounted on said inner side wall,
- an excrement collection bag member removably mounted to said annular bracket member, said excrement collection bag member having a flexible bag and a substantially L-shaped attachment tubular portion, said L-shaped attachment tubular portion being insertable into said circular opening of said annular bracket member for mounting thereto,
- a plurality of latching depressions formed in said attachment tubular portion and being operative to engage with said retractable latching means for securely mounting said excrement collection bag to said annular bracket member,
- a first fixed pouch located adjacent to said bracket member and adapted to carry said excrement collection bag and operative for protecting said excrement collection bag as well as for supporting said excrement collection bag when said excrement collection bag is filled with excrement.

13. A device according to claim 12 including an elongated slit opening formed in said diaper strap member and operative to permit tail of said animal to be inserted therethrough.

14. A device according to claim 13 wherein said latching members comprises a plurality of cylindrical pin members slidably mounted in side openings formed in said side wall of said annular bracket member, said cylindrical pin members having an end portion normally extending into said circular opening of said annular bracket member.

15. A device according to claim 14 including a plurality of coil springs provided on said cylindrical pin members, said coil springs exerting a biassing force to said cylindrical pin member to position said free end portions therein extending normally into said circular opening.

16. A device according to claim 15 including a retracting means mounted in said annular bracket member and operative to retract said free ends of said cylindrical latching pin members from said circular opening, said retracting means including a sliding pin member slidably mounted in said annular bracket member, a compression coil spring means mounted on said sliding pin member, a relatively large head means mounted on an end portion of said sliding pin member and extending outwardly from said side wall of said circular opening, substantially V-shaped pivot members mounted in said annular bracket member, said pivot members having an open slot therein slidably engaging with said sliding pin member and said latching members.

17. A device according to claim 16 including two arcuate housings integrally formed on two sides of said annular bracket member, said latching pin members, pivotal members and sliding pin member are located in said arcuate housings.

18. A device according to claim 17 including a circular base formed on said bracket member, said base being operative to abut the anal area of said animal.

19. A device according to claim 18 including a urine collection bag mounted on said diaper strap member and operative to collect urine discharge from said animal.

20. A device according to claim 19 including adjustable clamp means mounted on said diaper strap member and located on two ends of said elongated slit opening and being operative adjustably for snugly embracing said tail extending through said slit opening.

21. A device according to claim 20 including adjustable fastening means formed on said waist strap member and said diaper strap member and being operative adjustably for mounting said harness securely on said animal.

22. A device according to claim 21 wherein said urine collection bag includes a back flow preventing valve therein operative to prevent spillage of urine from said urine collection bag when said urine collection bag is filled.

23. A device according to claim 22 including a first pouch located adjacent to said bracket member and being operative for supporting said excrement collection bag when said excrement collection bag is filled, and a second pouch provided on said diaper strap member and adapted to carry said urine collection bag and being operative for supporting said urine collection bag when said urine collection bag is filled with urine.

* * * * *